United States Patent
Hwang et al.

(10) Patent No.: US 10,362,016 B2
(45) Date of Patent: Jul. 23, 2019

(54) DYNAMIC KNOWLEDGE-BASED AUTHENTICATION

(71) Applicant: INTERNATIONAL BUSINESS MACHINES CORPORATION, Armonk, NY (US)

(72) Inventors: Inseok Hwang, Austin, TX (US); Michael D. Kistler, Austin, TX (US); Janani Mukundan, Austin, TX (US); Gelareh Taban, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 15/408,512

(22) Filed: Jan. 18, 2017

(65) Prior Publication Data

US 2018/0205727 A1    Jul. 19, 2018

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01); *G06F 2221/2103* (2013.01)

(58) Field of Classification Search
CPC ...................... H04L 63/0861; G06F 2221/2103
See application file for complete search history.

(56) References Cited

U.S. PATENT DOCUMENTS

| | | | |
|---|---|---|---|
| 7,404,087 B2 | 7/2008 | Teunen | |
| 8,955,066 B1 * | 2/2015 | Ackerman | G06F 21/316 726/5 |
| 2003/0101104 A1 | 5/2003 | Dimitrova et al. | |
| 2003/0203756 A1 * | 10/2003 | Jackson | G07F 17/32 463/42 |
| 2009/0089876 A1 | 4/2009 | Finamore et al. | |
| 2009/0198587 A1 | 8/2009 | Wagner et al. | |
| 2009/0305670 A1 | 12/2009 | Deboer et al. | |
| 2015/0033305 A1 * | 1/2015 | Shear | G06F 21/45 726/11 |

OTHER PUBLICATIONS

Chen et al., . "Bayesian networks for knowledge-based authentication." IEEE Transactions on Knowledge and Data Engineering 19.5 (2007): 695-710.
Chiasson, et al. "Persuasive cued click-points: Design, implementation, and evaluation of a knowledge-based authentication mechanism." IEEE Transactions on Dependable and Secure Computing 9.2 (2012): 222-235.
Ullah et al., "Profile based student authentication in online examination." Information Society (i-Society), 2012 International Conference on. IEEE, 2012.

* cited by examiner

*Primary Examiner* — Khoi V Le
(74) *Attorney, Agent, or Firm* — Cantor Colburn LLP; Mercedes Hobson

(57) ABSTRACT

A computer-implemented method includes receiving user data from a plurality of data sources, where the user data describes a user. A plurality of events are determined within the user data by applying anomaly detection to the user data. A request to authenticate the user is received. A key event is selected from among the plurality of events, responsive to the request to authenticate the user. For the user, a challenge is generated, by a computer processor, based on the key event and responsive to the request to authenticate the user. A response to the challenge is received. It is decided whether to authenticate the user based on the response to the challenge.

20 Claims, 5 Drawing Sheets

USER DATA TABLE

| Time | ... | 4:00 | 4:01 | ... | 4:29 | 4:30 | 4:31 | 4:32 | 4:33 |
|---|---|---|---|---|---|---|---|---|---|
| Heart | ... | 100 | 100 | ... | 100 | 220 | 150 | 140 | 120 |
| Brake | ... | 0 | 0 | ... | 2 | 10 | 0 | 0 | 0 |
| # Passengers | ... | 1 | 1 | ... | 1 | 1 | 1 | 1 | 1 |
| Speed | ... | 56 | 50 | ... | 34 | 5 | 25 | 66 | 66 |

Fig. 2

DYNAMIC KNOWLEDGE-BASED AUTHENTICATION

BACKGROUND

Embodiments of the present invention relate to user authentication and, more specifically, to dynamic knowledge-based authentication.

Many systems require user authentication in order to provide security for data and activities inside the system. Generally, user authentication requires entry of a username and password. A user is likely to have secure accounts on multiple systems, including an enterprise network, social media, financial websites, and various other systems. As a result, the user is required to remember multiple passwords.

Some security systems use questions and answers for authentication, instead of or in addition to passwords. With such systems, a user is asked in advance to select one or more questions and then write answers for each selected question. Later, to authenticate himself, the user is presented with the questions previously selected, and must then supply the answers exactly as originally written.

SUMMARY

According to an embodiment of this disclosure, a computer-implemented method includes receiving user data from a plurality of data sources, where the user data describes a user. A plurality of events are determined within the user data by applying anomaly detection to the user data. A request to authenticate the user is received. A key event is selected from among the plurality of events, responsive to the request to authenticate the user. For the user, a challenge is generated, by a computer processor, based on the key event and responsive to the request to authenticate the user. A response to the challenge is received. It is decided whether to authenticate the user based on the response to the challenge.

In another embodiment, a system includes a memory having computer-readable instructions and one or more processors for executing the computer-readable instructions. The computer-readable instructions include receiving user data from a plurality of data sources, where the user data describes a user. Further according to the computer-readable instructions, a plurality of events are determined within the user data by applying anomaly detection to the user data. A request to authenticate the user is received. A key event is selected from among the plurality of events, responsive to the request to authenticate the user. For the user, a challenge is generated, based on the key event and responsive to the request to authenticate the user. A response to the challenge is received. It is decided whether to authenticate the user based on the response to the challenge.

In yet another embodiment, a computer-program product for attempting to authenticate a user includes a computer-readable storage medium having program instructions embodied therewith. The program instructions are executable by a processor to cause the processor to perform a method. The method includes receiving user data from a plurality of data sources, where the user data describes a user. Further according to the method, a plurality of events are determined within the user data by applying anomaly detection to the user data. A request to authenticate the user is received. A key event is selected from among the plurality of events, responsive to the request to authenticate the user. For the user, a challenge is generated, based on the key event and responsive to the request to authenticate the user. A response to the challenge is received. It is decided whether to authenticate the user based on the response to the challenge.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 2 is a table of example user data of the security system, according to some embodiments of this invention;

DETAILED DESCRIPTION

User authentication with passwords presents several difficulties. For instance, secure, randomized passwords tend not to be memorable. To enable a password to be secure and thus more difficult for a malicious party to guess, security systems often set requirements for passwords. For instance, passwords are often required to include numerals, a mix of capital and lowercase letters, and a special character. As a result, users have difficulty remembering their passwords.

An additional problem is that, in order for a user to remember a password, that password is likely to remain static for an extended period. For instance, a user is likely to use the same password for months or years, thus increasing the possibility that the password will be discovered by a malicious party. Further, for convenience, users often use the same or similar passwords across multiple security systems. Thus, once a malicious party has access to one secured account of the user, it becomes easier to gain access to other secured accounts.

Similar issues exist when questions and answers are used for authentication. When presented with previously selected questions for authentication, the user must remember the exact format used when he originally provided answers to those questions and must enter the answers in that exact format. Further, the user is likely to use the same or similar questions and answers across multiple security systems, and thus, a malicious party would find it easy to gain access to all the user's accounts after having gained access to a first one.

Turning now to an overview of aspects of the present invention, some embodiments of a security system according to this disclosure authenticate users by way of dynamic challenges that are drawn from a knowledge base. The knowledge base may be compiled from public data, private data, or both. The user need not select questions and provide exact answers in advance. Rather, the security system may gather data about the user, and may dynamically devise challenges based on that data. Further, fuzzy matching may be used to verify the user's responses to the challenges, such that there is little to no reliance on the user providing his answer in a specific format or with precise wording.

Figure 1:
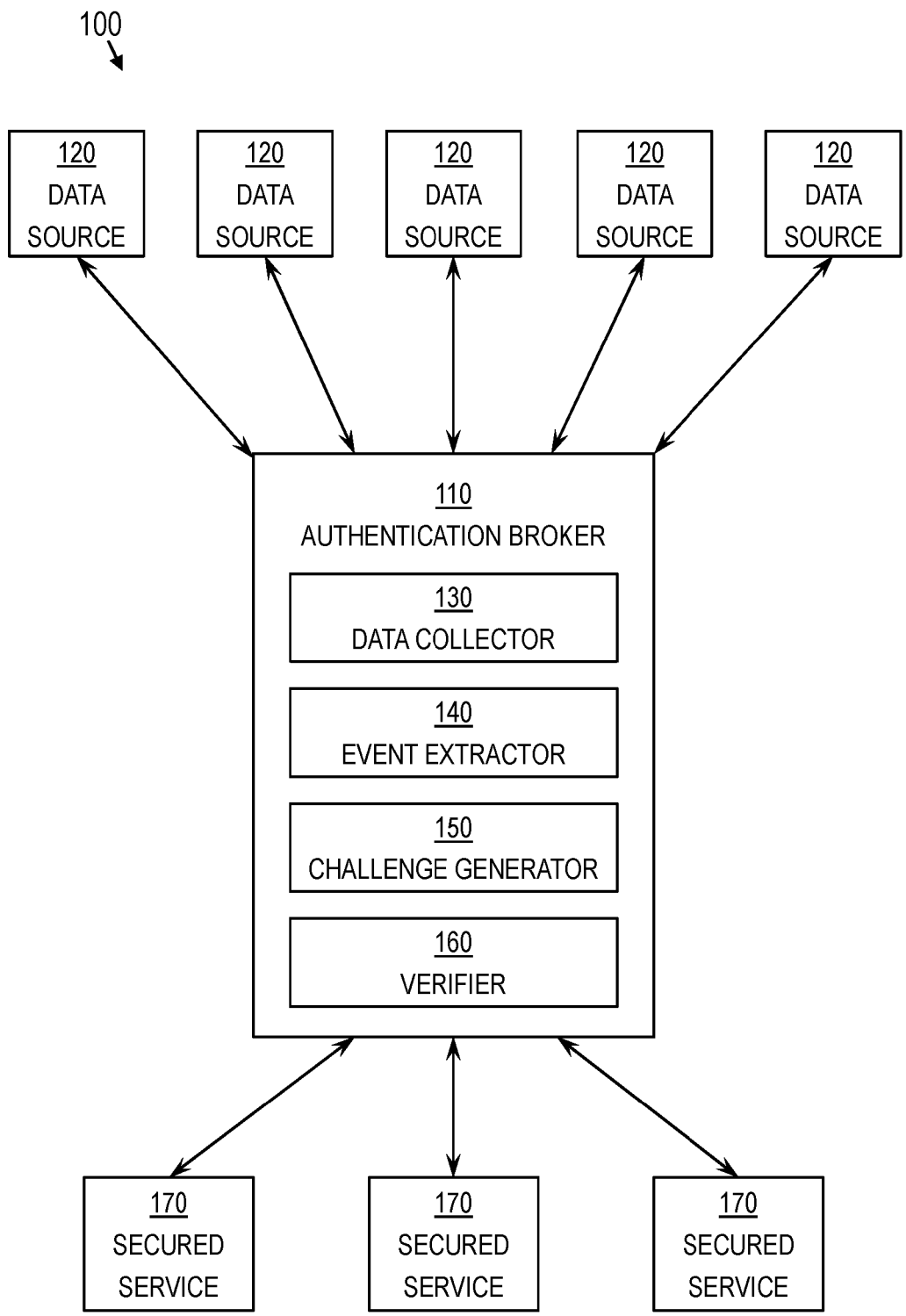
FIG. 1 is a block diagram of a security system, according to some embodiments of this invention.

FIG. 1 is a block diagram of the security system 100, according to some embodiments of this invention. As shown in FIG. 1, the security system 100 may include an authentication broker 110, which may receive user data from one or more data sources 120. The authentication broker 110 may be in communication with one or more secured services 170, each of which may use the security system 100, by way of the authentication broker 110, to authenticate a user requesting access to the secured service 170.

In some embodiments, the authentication broker may include or be in communication with a data collector 130, an event extractor 140, a challenge generator 150, and a verifier 160. Generally, the data collector 130 may collect user data from the data sources 120; the event extractor 140 may graph knowledge known about a user and analyze patterns in the user data to extract events upon which challenges can be based; the challenge generator 150 may generate challenges for user authentication; and the verifier 160 may verify the user's responses to the challenges. It will be understood that although the data collector 130, the event extractor 140, the challenge generator 150, and the verifier 160 are illustrated as distinct components in FIG. 1, these components may be combined or further divided based on design decisions.

Generally, a user may have an account established with the security system 100, and thus with the authentication broker 110. The authentication broker 110 may receive user data from the one or more data sources 120. A secured service 170 may be a service that requires user authentication for access. For example, and not by way of limitation, the secured service 170 may be a computer network, a website, a web application, an email server, a financial account, or other service. The user may have or desire an account with, or some other form of access to, the secured service 170. To gain the desired access, the user may be authenticated through the authentication broker 110. The authentication broker 110 may confirm the user's identity to the secured service 170 based on the user's responses to dynamic challenges, which may be devised by the authentication broker 110 based on the user data.

In some embodiments, a secured service 170 may be integrated with the authentication broker 110. In other words, the authentication broker 110 may be part of the secured service 170 such that no third party need be contacted to verify the user's identity.

In some embodiments, the data collector 130 of the authentication broker 110 may collect user data from the data sources 120. Each data source 120 may be a source of user data describing one or more users. The user data associated with a user may describe the user and may include public data, private data, or both. In some embodiments, some or all user data may be associated with timestamps, such that the security system 100 may match items of the user data with times at which such items occurred. Further, in some embodiments, the security system 100 may take advantage of the internet of things (IoT), such that internet-connected devices are used as data sources 120. For example, and not by way of limitation, data sources 120 may include fitness trackers, smartphones, vehicles, and social media systems (e.g., Facebook®, Twitter®, LinkedIn®). For instance, a smartphone may be a data source 120 providing an associated user's location (e.g., by way of global positioning system (GPS), or cellular tower), wireless fidelity (WiFi) connections, Bluetooth connections, calendar, task list, emails, text messaging, contacts list, and other data. A vehicle may be a data source 120 providing an associated user's location, braking history, acceleration and velocity history, the number of passengers, and other data. A social media system may be a data source 120 providing information disclosed in a user's posts, or information about the user's friends and groups and their posts. In some embodiments, a data source 120 may provide user data that is biological or cyber-physical. For instance, a user's fitness tracker may be a data source 120 providing an associated user's heart rate, as well as location, workout times, and activities. It will be understood that various other data sources 120 may be used instead of or in addition to these.

In some embodiments, a data source 120 may be enabled to provide information to the authentication broker 110 about a user only after the user provides permission for that provision of information. However, in some cases, the security system 100 may be able to provide a broader range of questions or greater accuracy when provided a large range of data sources 120 for the user. Further, user data may be validated by comparing information received from a single data source 120 or across multiple data sources 120, and as a result, a larger number of data sources 120 may lead to both a larger volume of user data as well as more accurate user data.

The security system 100 may identify anomalies in the user data for each user, and these anomalies may be used to identify events on which authentication challenges may be devised. In some embodiments, these operations may be performed by the event extractor 140 of the authentication broker 110. To this end, the security system 100 may perform temporal clustering on the user data for a user. This clustering may be performed using techniques known in the art, such as k-means clustering. The security system 100 may then perform anomaly detection on the clustered user data. For example, and not by way of limitation, this anomaly detection may be performed by unsupervised learning to extract patterns that represent high-level activities. This can be performed by techniques known in the art.

FIG. 2 is an example table of user data describing a user, according to some embodiments of this invention. In this example, the table includes user data received from data sources 120 including a fitness tracker, a smartphone, and a vehicle. The user data includes timestamped information describing the user's heart rate, braking, the number of passengers in the vehicle, and speed. In this example, heart rate is given in beats per minute, braking is given in units such that a higher number reflects greater pressure applied to the brakes and a lower number reflects lesser pressure applied to the brakes, and speed is given in miles per hour. As shown in the table of FIG. 2, the user's heart rate jumped dramatically at 4:30 pm, braking pressure increased, and speed dropped. At this time, there was one passenger in the vehicle, and that passenger was the user. Given the abrupt change in heart rate, speed, and braking, the security system 100 could classify this as an anomaly.

Figure 3:
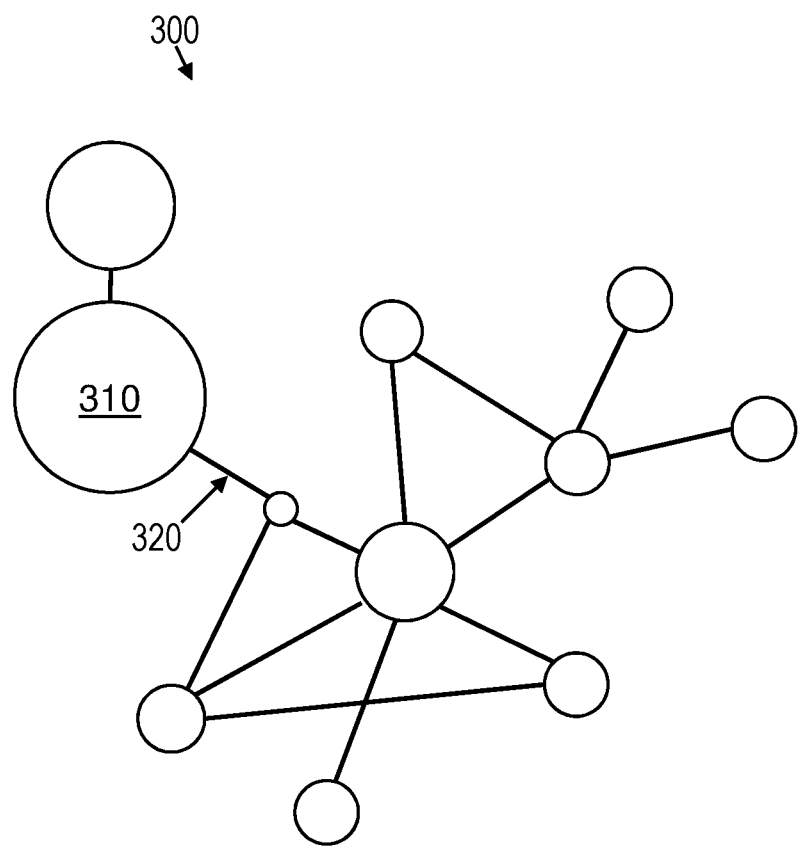
FIG. 3 is an example knowledge graph of the security system, according to some embodiments of this invention.

The security system 100 may generate a knowledge graph corresponding to each user, and that knowledge graph may be a graph of events, where each event is an anomaly identified in the user data for the user. FIG. 3 is an example knowledge graph 300 for one user, according to some embodiments of this invention. As shown in FIG. 3, various events 310 may be represented as nodes in the knowledge graph 300, and edges 320 may connect related pairs of such events 310. An edge 320 may be drawn between two events 310 in the knowledge graph 300 if those two events 310 are deemed connected. Connections may be of various types, such as temporal, geographical, relationship-related, aspect of life, or other types of connections. For example, a connection may be deemed to exist between two events 310 that are related to the user's job, occurred within the same hour, involve the same friend, or occurred in the same location. Thus, an edge 320 would be generated in the knowledge graph between two such events 310.

In some embodiments, Bayesian modeling may be used to generate probability distributions for events 310 that have occurred. As discussed above, anomaly detection may be used to identify events, but in some embodiments, Bayesian modeling may be used to generate weighted edges 320 in the knowledge graph 300. The weight of a weighted edge 320 may reflect the probability that the events 310 adjacent to the weighted edge 320 are related (i.e., connected). Further, in some embodiments, a probability threshold may be used to determine whether an edge should exist at all between two events 310 in the knowledge graph 300.

In some embodiments, a knowledge graph 300 may incorporate user data from other users who have relationships with the user associated with the knowledge graph 300. For example, and not by way of limitation, the security system 100 may be aware of user relationships by way of user data received from social media systems, or may be aware of information (e.g., workplace) that is similar across users and thus forms a connection. In the case of such connections, events 310 may be added to a first user's knowledge graph 300 based on user data describing a second user. For example, if an event 310 is determined from user data of a second user, where that event 310 is related to a workplace of the second user, and where the first user and the second user share a workplace, then that event 310 may also be added to the knowledge graph 300 of the first user.

The security system 100 may generate challenges for a user based on events 310 detected and, in some embodiments, further based on the knowledge graph 300 of the user. In some embodiments, each challenge may be generated dynamically, when the user attempts to access a secured service 170. However, in some embodiments, challenges may be generated offline, and then presented to the user when the user attempts access to a secured service 170. In some embodiments, the generation of challenges may be performed by the challenge generator 150 of the authentication broker 110.

In generating a challenge, the security system 100 may select at least one event 310 on which to base the challenge. Generally, the security system 100 may seek an event 310 that is both memorable and safe. In this disclosure, memorability refers to a likelihood that a user will recall an event 310. The security system 100 may seek an event 310 with high memorability because, if a user remembers the event 310, that user is more likely to be able to correctly respond to a challenge (e.g., answer a question) based on that event 310. In this disclosure, safety refers to a likelihood that an event 310 is not known or not memorable to people other than the user. The security system 100 may seek a safe event 310 to ensure that a person other than the user cannot gain access to the secured service 170 by knowing how to correctly respond to the challenge based on the event 310.

In some embodiments, both memorability and safety may be reflected by a respective number, which may be determined by a respective function. Specifically, memorability may be calculated by a memorability function, and safety may be calculated by a safety function. These functions may vary based on implementation. However, in some embodiments, the memorability function may be based on factors that include one or more of the following: recurrence, rarity, biological changes (e.g., changes in heart rate), social importance, personal importance, contextual importance, and user profile. The user profile may refer to information known about the user by the security system 100, which may include user data and the knowledge graph 300, for example. Further, if Bayesian modeling is being used, the probability distribution of an event's occurrence may also contribute to the memorability function. In some embodiments, the safety function may be based on factors including one or more of the following: passive versus active involvement by other people, online mining, guessability, and user profile. With respect to passive versus active involvement of other people, this may be considered by the safety function because another person is less likely to recall an event 310 if she was only passively involved in it, but that other person is more likely to recall the event 310 if she was actively involved in the event 310. Online mining refers to the ability to discover information about the event 310 online. The security system 100 may perform online mining related to an event 310 before using the event 310 as a challenge and may incorporate results found from the online mining into a determination of safety. Guessability refers to the likelihood of someone other than the user being able to guess the event 310.

When generating a challenge, the security system 100 may select an event 310 that is both memorable and safe. In some embodiments, this may be achieved by selecting an event 310 in which the calculated memorability falls into a desirable memorability range, and the calculated safety falls into a desirable safety range. For instance, if a high value for memorability suggests a more memorable event 310, then calculated memorability of an event 310 may be required to be above a memorability threshold for selection, but if a low value for memorability suggests a more memorable event 310, then the calculated memorability of the event 310 may be required to be below the memorability threshold for selection. Analogously, if a high value for safety suggests a safer event 310, then calculated safety of an event 310 may be required to be above a safety threshold for selection, but if a low value for safety suggests a safer event 310, then the calculated safety may be required to be below the safety threshold for selection.

When authentication to a secured service 170 is requested, in some embodiments, the security system 100 may generate a challenge including one or more questions, and the security system 100 may further generate an expected answer for each of the one or more questions in the challenge. Alternatively, however, challenges may be generated offline, such that they are ready to be presented when authentication to the secured service 170 is requested. For each challenge, one or more events 310 may be used on which to base that challenge. After at least one event 310 for a challenge is selected, in some embodiments, the security system 100 may generate a challenge using template-based challenge generation, multi-tiered challenge generation using episodic memory model, or both.

With template-based challenge generation, the security system 100 may have access to a set of challenge templates. For example, one template may be as follows: "What were you doing on [date and time]?" To use this template, the security system 100 may simply fill in the date and time of the event 310 selected. In this case, the expected response to the challenge is an activity that the security system 100 knows the user was performing, based on the user data. Other example templates are as follows: "At what time on

[date] did you perform [activity]?" and "What song did you listen to while you performed [activity]?"

Multi-tiered challenge generation using episodic memory may involve generating a challenge having two or more questions that are related to one another and build on one another. A benefit of this technique is that early questions in a series may be used to jog a user's memory, thus improving the chances that the user can respond correctly to the challenge. Returning to the example of the table shown in FIG. 2, the security system 100 may determine that an accident, near-accident, or other significant incident occurred in the user's vehicle at 4:30 pm. Based on this event 310, the security system 100 may devise a multi-tiered challenge, where the first question in the challenge is: "What were you doing at 4:30 pm on Monday?" An acceptable response to this challenge would be "driving," for example. A second question in the challenge may ask: "Did anything happen while you were driving?" Acceptable answers to this question could include "almost had an accident" or "was rear-ended," for example.

In some embodiments, the security system 100 may receive an answer to each question in a challenge. To verify the user's identity, the security system 100 may determine whether the user's answers are correct. Specifically, in some embodiments, this determination may be performed by the verifier 160 of the authentication broker 110. However, because the answers are not passwords with a specific format that must match character-by-character, as is conventionally the case, the security system 100 need not require answers that precisely match the expected answers to the questions. In some embodiments, the security system 100 may compare the user's answers to the expected answers using fuzzy matching. If each answer is deemed to match the corresponding expected answer, such as via fuzzy matching, then the security system 100 may deem the user's answers to be correct. As such, the security system 100, specifically the authentication broker 110 for example, may verify the user's identity and may notify the secured service 170 that the user has been authenticated. The secured service 170 may then allow the user to access secure data and services.

Alternatively, however, in some embodiments, the security system 100 may provide the secured service 170 with the complete challenge, including one or more questions and the corresponding one or more answers. In this case, the secured service 170 may be responsible for determining whether the user correctly responds to the challenge.

In some embodiments, if the user fails to correctly respond to a challenge, the security system 100 may offer an additional challenge, which may be generated as described above. The additional challenge may give the user another chance to authenticate himself, which may be necessary, for example, if the selected event 310 is not as memorable as determined by the security system 100. Different users remember different categories of events 310. Thus, the security system 100 may keep track of the types of challenges the user tends to answer correctly and the types the user tends to answer incorrectly. For example, and not by way of limitation, a user may have a good memory for music and may usually correctly respond to challenges about the music he listened to. When a user responds to a challenge correctly, this may be reflected in association with the knowledge graph 300. Due to the use of the edges 320 to connect related events 310, events 310 may be clustered based on similarity. A correct challenge response may add greater weight to a cluster of the knowledge graph 300 near the event 310 used to devise the challenge, while conversely, an incorrect challenge response may reduce the weight of the cluster of the knowledge graph 300.

Specifically, for instance, each event 310 in the knowledge graph 300 may be associated with a corresponding weight. A correct answer to a challenge may increase the weight of the events 310 upon which the challenge was devised, and further the correct response may increase, to a lesser degree, the weights of events 310 connected by edges 320 to those used in the challenge. In the example knowledge graph 300 of FIG. 3, the weighting is illustrated by the size of each node representing the corresponding event 310. This weighting may be incorporated into the user profile, of which the knowledge graph 300 is a part, and may thus be used when determining the memorability of events 310 being considered for future challenges. As a result, the user's ability to answer certain types of challenges (i.e., challenges based on certain types of events 310) may affect the generation of later challenges of those types. Thus, the knowledge graph 300 may be adaptable based on learning performed automatically by the security system 100.

Figure 4:
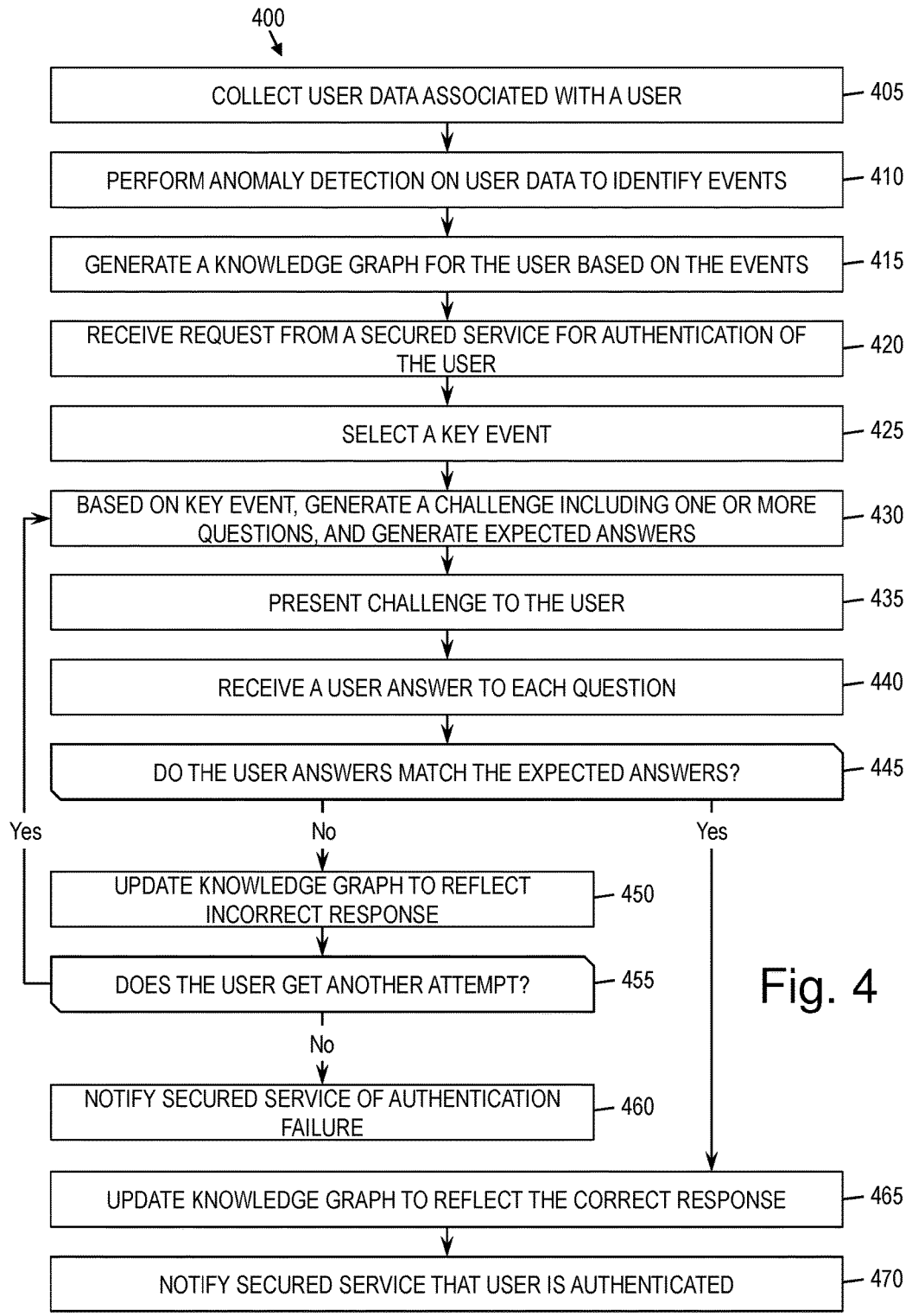
FIG. 4 is a flow diagram of a method for authenticating a user, according to some embodiments of this invention.

FIG. 4 is a flow diagram of a method 400 for authenticating a user, according to some embodiments of this invention. It will be understood that, although this method 400 refers to a single user, the security system 100 may perform these operations to provide authentication for numerous users. As shown in FIG. 4, at block 405, user data may be collected in association with a user. At block 410, anomaly detection may be performed on the user data to identify a set of events 310. In some embodiments, the anomaly detection may include temporal clustering and then detection of anomalies from among the clusters. At block 415, a knowledge graph 300 may be generated based on the identified events 310.

At block 420, in some embodiments, user authentication may be requested by a secured service 170 for the user. However, in some embodiments, blocks 425 and 430 may occur before user authentication is requested. In that case, the security system 100 may select key events and generate challenges, at blocks 425 and 430, such that challenges are ready to be presented when user authentication is requested. At block 425, a key event 310 may be selected from those identified. In some embodiments, this selection may be based on calculated memorability, may be based on calculated safety, and may take the knowledge graph 300 into consideration. At block 430, one or more questions and corresponding expected answers may be generated as a challenge based on the key event 310. At block 435, the challenge may be presented to the user. At block 440, the user may provide an answer to each question in the challenge. At decision block 445, it may be determined whether the user's one or more answers match the corresponding expected one or more answers. Fuzzy matching may be performed to make this determination. In some embodiments, however, the secured service 170 may be responsible for determining whether the user's response to the challenge matches the one or more expected answers.

If the user's answers do not match the expected answers, then at block 450 the knowledge graph 300 may be updated to reflect the incorrect response. Additionally, at decision block 455, it may be determined whether the user gets to make another attempt. If another attempt is allowed, then the method 400 may return to block 430, where generation of an additional challenge may occur. Alternatively, in some embodiments, the method 400 may return to block 425, where a new key event may be selected, upon which the additional challenge may be based. If no additional attempt is allowed (e.g., if the user has reached a threshold number of incorrect answers), then at block 460 authentication may fail, and the secured service 170 may be notified of the failure. However, if the user's answers are deemed to match the expected answers, then at block 465, the knowledge graph 300 may be updated to reflect the correct response. Additionally, at block 470, the user may be authenticated, and the security system 100 may verify the user's identity to the secured service 170.

Figure 5:
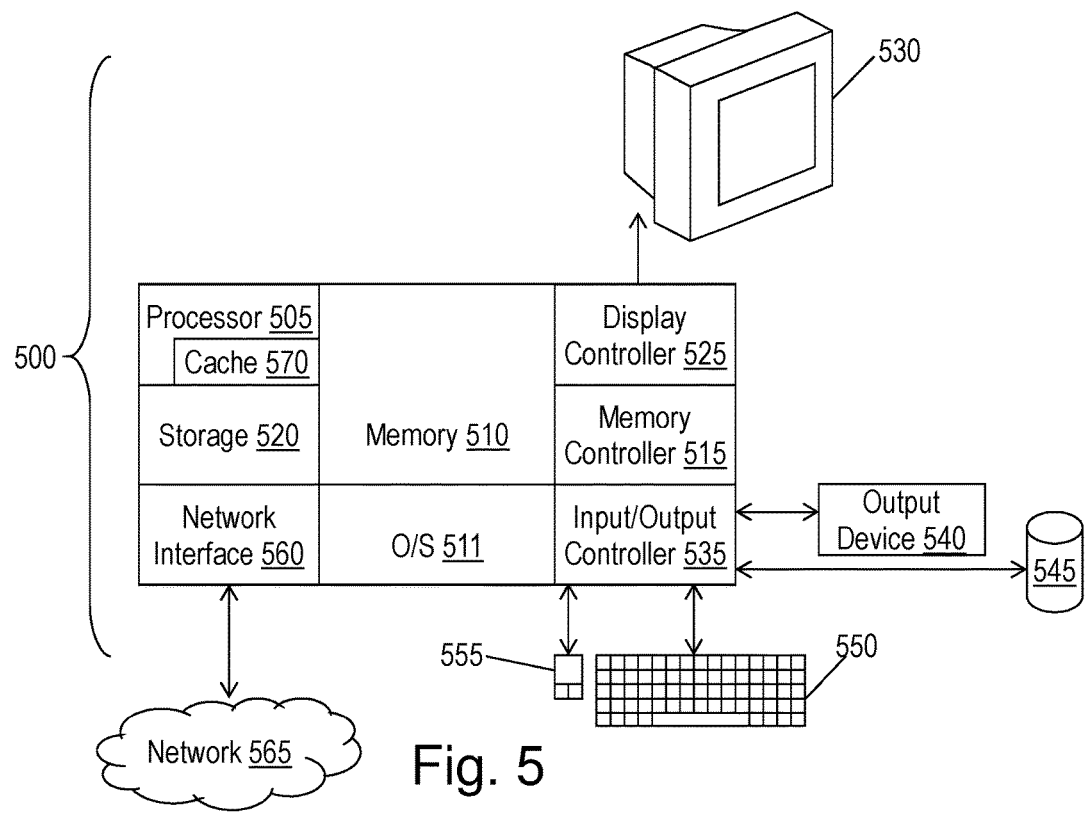
FIG. 5 is a block diagram of a computer system for implementing some or all aspects of the security system, according to some embodiments of this invention.

FIG. 5 illustrates a block diagram of a computer system 500 for use in implementing a security system 100 or method according to some embodiments. The security systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For example, and not by way of limitation, the authentication broker 110 of the security system 100 may be implemented on a computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the security systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Security systems 100 and methods according to this disclosure may be embodied, in whole or in part, in computer program products or in computer systems 500, such as that illustrated in FIG. 5.

Technical effects and benefits of some embodiments include the ability to authenticate a user without the use of pre-established passwords or questions. Some embodiments of the security system 100 described herein may dynamically generate authentication challenges based on user data collected, including user data from IoT, biological sensors, and cyber-physical sensors. More specifically, the security system 100 may apply adaptive learning to a knowledge graph 300 based on this user data and may generate dynamic challenges as a result.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving user data from a plurality of data sources, wherein the user data describes a user;
   determining a plurality of events in a real life of the user within the user data by applying anomaly detection to the user data;
   generating a knowledge graph to represent the plurality of events in the real life of the user, wherein the knowledge graph comprises a plurality of nodes;
   wherein each node of the knowledge graph represents an event in the real life of the user, and wherein an edge between a first node and a second node in the knowledge graph represents a connection between a first event represented by the first node and second event represented by the second node;
   receiving a request to authenticate the user;
   selecting a key event from among the plurality of events, based at least in part on the knowledge graph representing the plurality of events in the real life of the user, responsive to the request to authenticate the user;
   generating, by a computer processor, for the user a challenge based on the key event selected based at least in part on the knowledge graph representing the plurality of events in the real life of the user, responsive to the request to authenticate the user;
   receiving a response to the challenge; and
   deciding whether to authenticate the user based on the response to the challenge.

2. The computer-implemented method of claim 1, wherein a first data source of the plurality of data sources is at least one of a biological reader or a cyber-physical reader.

3. The computer-implemented method of claim 1, wherein a first data source of the plurality of data sources is an internet-of-things device associated with the user.

4. The computer-implemented method of claim 1, wherein the selecting the key event comprises:
   calculating a respective safety value for each of the plurality of events; and
   determining that the respective safety value of the key event falls within an established safety range.

5. The computer-implemented method of claim 1, wherein the selecting the key event comprises:
   calculating a respective memorability value for each of the plurality of events; and
   determining that the respective memorability value of the key event falls within an established memorability range.

6. The computer-implemented method of claim 1, further comprising:
   automatically updating the knowledge graph to reflect correctness of the response to the challenge; and
   selecting an additional key event from among the plurality of events in the real life of the user, based at least in part on the knowledge graph, after automatically updating the knowledge graph; and
   generating for the user an additional challenge based on the additional key event.

7. The computer-implemented method of claim 1, further comprising automatically updating the knowledge graph to reflect correctness of the response to the challenge.

8. A system comprising:
   a memory having computer readable instructions; and
   one or more processors for executing the computer readable instructions, the computer readable instructions comprising:
   receiving user data from a plurality of data sources, wherein the user data describes a user;
   determining a plurality of events in a real life of the user within the user data by applying anomaly detection to the user data;
   generating a knowledge graph to represent the plurality of events in the real life of the user, wherein the knowledge graph comprises a plurality of nodes;
   wherein each node of the knowledge graph represents an event in the real life of the user, and wherein an edge between a first node and a second node in the knowledge graph represents a connection between a first event represented by the first node and second event represented by the second node;
   receiving a request to authenticate the user;
   selecting a key event from among the plurality of events, based at least in part on the knowledge graph representing the plurality of events in the real life of the user, responsive to the request to authenticate the user;
   generating for the user a challenge based on the key event selected based at least in part on the knowledge graph representing the plurality of events in the real life of the user, responsive to the request to authenticate the user;
   receiving a response to the challenge; and
   deciding whether to authenticate the user based on the response to the challenge.

9. The system of claim 8, wherein a first data source of the plurality of data sources is at least one of a biological reader or a cyber-physical reader.

10. The system of claim 8, wherein a first data source of the plurality of data sources is an internet-of-things device associated with the user.

11. The system of claim 8, wherein the selecting the key event comprises:
    calculating a respective safety value for each of the plurality of events; and
    determining that the respective safety value of the key event falls within an established safety range.

12. The system of claim 8, wherein the selecting the key event comprises:
    calculating a respective memorability value for each of the plurality of events; and determining that the respective memorability value of the key event falls within an established memorability range.

13. The system of claim 8, further comprising:
automatically updating the knowledge graph to reflect correctness of the response to the challenge; and
selecting an additional key event from among the plurality of events in the real life of the user, based at least in part on the knowledge graph, after automatically updating the knowledge graph; and
generating for the user an additional challenge based on the additional key event.

14. The system of claim 8, the computer-readable instructions further comprising automatically updating the knowledge graph to reflect correctness of the response to the challenge.

15. A computer-program product for attempting to authenticate a user, the computer program product comprising a non-transitory computer-readable storage medium having program instructions embodied therewith, the program instructions executable by a processor to cause the processor to perform a method comprising:
receiving user data from a plurality of data sources, wherein the user data describes a user;
determining a plurality of events in a real life of the user within the user data by applying anomaly detection to the user data;
generating a knowledge graph to represent the plurality of events in the real life of the user, wherein the knowledge graph comprises a plurality of nodes;
wherein each node of the knowledge graph represents an event in the real life of the user, and wherein an edge between a first node and a second node in the knowledge graph represents a connection between a first event represented by the first node and second event represented by the second node;
receiving a request to authenticate the user;
selecting a key event from among the plurality of events, based at least in part on the knowledge graph representing the plurality of events in the real life of the user, responsive to the request to authenticate the user;
generating for the user a challenge based on the key event selected based at least in part on the knowledge graph representing the plurality of events in the real life of the user, responsive to the request to authenticate the user;
receiving a response to the challenge; and
deciding whether to authenticate the user based on the response to the challenge.

16. The computer-program product of claim 15, wherein a first data source of the plurality of data sources is at least one of a biological reader, a cyber-physical reader, and an internet-of-things device associated with the user.

17. The computer-program product of claim 15, wherein the selecting the key event comprises:
calculating a respective safety value for each of the plurality of events; and
determining that the respective safety value of the key event falls within an established safety range.

18. The computer-program product of claim 15, wherein the selecting the key event comprises:
calculating a respective memorability value for each of the plurality of events; and
determining that the respective memorability value of the key event falls within an established memorability range.

19. The computer-program product of claim 15, further comprising:
automatically updating the knowledge graph to reflect correctness of the response to the challenge; and
selecting an additional key event from among the plurality of events, based at least in part on the knowledge graph, after automatically updating the knowledge graph; and
generating for the user an additional challenge based on the additional key event.

20. The computer-program product of claim 15, the method further comprising automatically updating the knowledge graph to reflect correctness of the response to the challenge.

* * * * *